(12) United States Patent
Almalki et al.

(10) Patent No.: US 9,792,462 B2
(45) Date of Patent: Oct. 17, 2017

(54) SUSPICIOUS PORTABLE DEVICE MOVEMENT DETERMINATION

(71) Applicant: BlackBerry Limited, Waterloo (CA)

(72) Inventors: Nazih Almalki, Waterloo (CA); Robert George Oliver, Waterloo (CA); Zhe Chen, Kitchener (CA); Andrew Michael Inwood, Waterloo (CA); Marcin Cietwierkowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 97 days.

(21) Appl. No.: 14/834,156

(22) Filed: Aug. 24, 2015

(65) Prior Publication Data

US 2017/0061166 A1     Mar. 2, 2017

(51) Int. Cl.

| | |
|---|---|
| H04L 29/06 | (2006.01) |
| G06F 21/88 | (2013.01) |
| H04M 1/725 | (2006.01) |
| H04W 4/02 | (2009.01) |
| H04W 12/12 | (2009.01) |
| G06F 21/31 | (2013.01) |
| G06F 1/26 | (2006.01) |
| G06F 11/00 | (2006.01) |
| G08B 13/00 | (2006.01) |
| G08B 21/00 | (2006.01) |
| G08B 29/00 | (2006.01) |

(52) U.S. Cl.
CPC ............ *G06F 21/88* (2013.01); *G06F 21/31* (2013.01); *H04M 1/72577* (2013.01); *H04W 4/021* (2013.01); *H04W 12/12* (2013.01); *H04M 2250/12* (2013.01)

(58) Field of Classification Search
None
See application file for complete search history.

(56) References Cited

U.S. PATENT DOCUMENTS

| | | | | |
|---|---|---|---|---|
| 8,559,924 | B1 * | 10/2013 | Henderson | G08B 27/006 455/410 |
| 9,088,560 | B1 * | 7/2015 | Newstadt | H04L 63/08 |
| 2006/0236373 | A1 * | 10/2006 | Graves | G06F 19/327 726/3 |
| 2010/0115092 | A1 * | 5/2010 | Westin | H04L 41/12 709/224 |

(Continued)

OTHER PUBLICATIONS

Extended European Search Report dated Jan. 12, 2017, received for European Application No. 16182090.7.

*Primary Examiner* — Eric Chen
(74) *Attorney, Agent, or Firm* — Jeffrey N. Giunta; Fleit Gibbons Gutman Bongini & Bianco P.L.

(57) ABSTRACT

A system and method to determine suspicious movement of a portable device are disclosed. A determination is made that an update received by a local device was sent from a remote device different than the local device. A suspicious movement of the local device is determined based upon determining that the local device is moving at a time associated with the update and based upon determining the update originated from the remote device. Based on determining the suspicious movement, a notification of unauthorized device movement is provided.

20 Claims, 5 Drawing Sheets

(56) References Cited

U.S. PATENT DOCUMENTS

| | | | | |
|---|---|---|---|---|
| 2010/0250921 A1* | 9/2010 | Spencer | ............... | H04L 9/3273 |
| | | | | 713/155 |
| 2010/0279656 A1* | 11/2010 | Hazzani | ................ | G06Q 20/18 |
| | | | | 455/411 |
| 2010/0306821 A1* | 12/2010 | Cathcart | ............... | G06Q 10/10 |
| | | | | 726/3 |
| 2012/0309354 A1* | 12/2012 | Du | ...................... | H04W 12/12 |
| | | | | 455/411 |
| 2013/0019304 A1* | 1/2013 | Cai | ....................... | H04M 1/66 |
| | | | | 726/16 |
| 2014/0009289 A1* | 1/2014 | Berger | .................. | G06F 21/88 |
| | | | | 340/568.1 |
| 2014/0057596 A1* | 2/2014 | Brill | ..................... | H04L 63/126 |
| | | | | 455/410 |
| 2014/0338006 A1* | 11/2014 | Grkov | ................... | H04L 63/14 |
| | | | | 726/35 |
| 2015/0067785 A1* | 3/2015 | Donnellan | ........... | H04W 12/12 |
| | | | | 726/4 |

\* cited by examiner

SUSPICIOUS PORTABLE DEVICE MOVEMENT DETERMINATION

FIELD OF THE DISCLOSURE

The present disclosure generally relates to detecting unexpected movement of devices, and more particularly to detecting device movement by someone other than the device's owner.

BACKGROUND

Portable electronic devices are sometimes used for many of the same purposes as are larger generally stationary computers, such as desk top computers or even laptops which are often placed on a table or other stationary location while being used. For example, both portable electronic devices and larger computers are able to be used to send e-mails, instant messaging messages, various types of social media postings, other data items that can be sent, or combinations of these.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
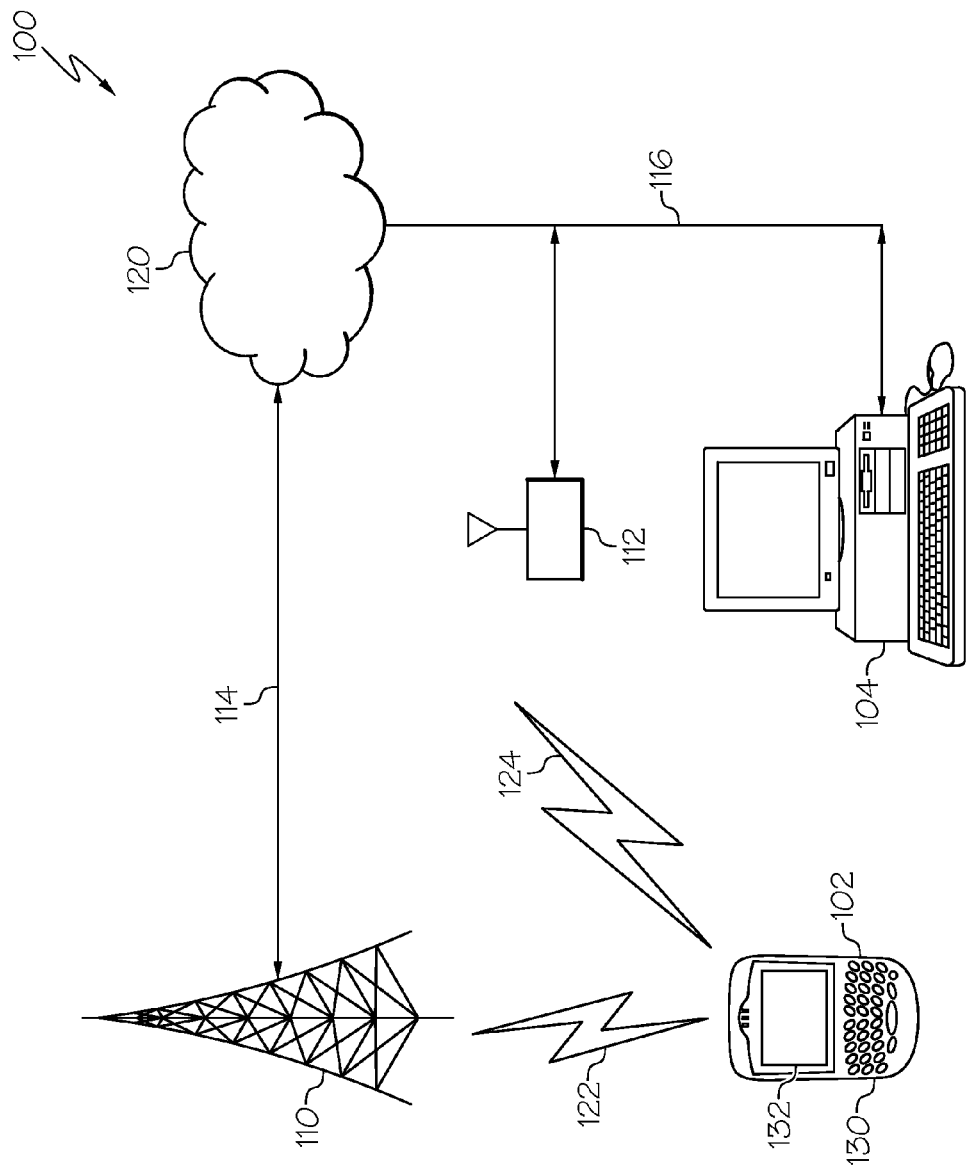
FIG. 1 illustrates a multiple communications device environment, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods are directed to operations of a portable electronic device that assist the owner of the device in determining if there is a possibility that the device was taken without the owner's knowledge. The portability of portable electronic devices is able to render these devices more susceptible to be taken by persons other than the device's owner. An unauthorized person may, for example, take a portable electronic device and carry it away from the location where the device's owner expects the device to be. Once the device is taken by the unauthorized person, the owner of the device may have difficulty in finding and recovering the device. Even if the unauthorized person mistakenly took the device, it is inconvenient for the device's owner to find and recover the device if the device was taken some distance before the owner discovers the device is missing. In the case of an unauthorized person intentionally taking the portable electronic device, delay in the owner's discovery of its missing allows the unauthorized person to retrieve information from the device or otherwise access the device before the owner is able to take mitigating actions, such as attempting to remotely "wipe" the device or otherwise disable its functions.

In an example of the below described systems and methods, the owner of a device is provided with a notification of suspicious movement of the device, which may be caused by the device's being taken without the owner's knowledge. This notification is able to be provided, in one example, via a supported communication channel that the owner is currently using such as via e-mail, a messaging program, any other communications channel, or combinations of these. In some examples, this notification is able to also be received by one or more other individuals, automated processing equipment, or combinations of these. In such examples, the other individuals, automated processing equipment, or combinations of these, are able to respond to this notification and cause various actions to be performed relative to the device.

In one example, a processor monitors the device by monitoring sensors and operations on the device to determine the occurrence of two events or states. If both of these events or states are determined to exist at the same time, a suspicious movement of the device is determined to have occurred. This suspicious movement of the device may correspond to, for example, the device's being stolen or mistakenly taken by an unauthorized person. When this suspicious movement is determined, the device in one example is flagged as possibly stolen and the user is notified. Further actions are able to be taken based on this determination, such as locking the device, modifying categories of information that other systems send to the device, any other changes, or combinations of these.

In this description an "owner" of a device is generally a person who is authorized to use the device, has custody of the device or with whom the device is normally associated. The term "owner" herein is used to refer to a person who is assumed to have possession of the device, and movement of the device when the "owner" is not moving implies movement of the device by a third party who may not be authorized to take the device. The term "owner" does not necessarily correspond to legal ownership of or title to the device.

The systems and methods described below operate to detect movement of the device by a third party, other than the device's owner, and notify the owner of such suspicious movement. The movement may, in fact, be authorized by the owner. If the movement is authorized, the owner would not need to take action. However, if movement of the device by a third party is not expected by the owner, additional actions can be taken to find the device, disable device, take other actions, or combinations of these. These additional actions are able to be initiated by the owner or by another person who is also notified of the detected movement of the device by the third party. In some examples, these additional actions are able to be initiated automatically by a central server, another device, the portable electronic device itself, another device, or combinations of these.

The two states or conditions that are determined by monitoring sensors or operations of the device are as follows.

1) Sensors or other facilities are monitored to determine if the device is in motion. In an example, this is determined via an accelerometer and gyroscope. In some examples, possibly higher level virtual sensors such as a step detector are able to be used to determine that the device is in motion.

2) Operations of the device are monitored to determine if the owner of the device is currently using accounts that are associated with the owner of the device and that are activated on the device, but the use of those accounts by the owner is not on the device itself. In an example, the owner of the device is able to send a message or other update in an email message, in an Instant Messaging message, in a BBM® message, by sending text messages through, for example, BlackBerry Blend® on his or her desktop computer or other device, by another medium, or combinations of these.

In general, all devices activated with the account through which the owner sends the message or other update will all receive the message or update, or at least a notification of the message or update. A portable electronic device activated with the owner's account will be notified of the owner's sending a message or other update from another device because the portable electronic device receives these updates. The device is able to, for example, determine that the message or update received from the owner was sent from another device and not by the portable electronic device itself.

In an example, the concurrent existence of these two states or conditions, i.e., the device is moving while the owner sends a message or other type of update from another device, may indicate that the owner of the device is not with that device while the device is also moving. These two concurrent occurrences could be an indication that the device is stolen or mistakenly picked up by third party. Detecting that these two states or conditions occurred at the same time in an example causes the device send a notification to the owner of the device. The inference that the device is mistakenly taken, stolen, or otherwise moved without the owner's knowledge, is based an assumption that the owner's use of another device implies that the owner is stationary and that the owner is not moving, so movement of the device is due to another person's taking the device.

In an example, the notification is sent to the owner through a communication channel that the user was using when it was observed that the owner was using another device while the portable device was moving. For example, if the determination that the user of the device is currently using accounts on another device is based on receiving a BBM® message from the owner of the device while the device is moving, and that BBM® message was not send from the local device, the local device is able to can send the owner a BBM® message as a notification that the device is on the move. In further examples, the notification is able to be sent through any one or more suitable communications channel.

FIG. 1 illustrates a multiple communications device environment 100, according to an example. The multiple communications device environment 100 depicts two communications devices, a portable electronic device 102 and a computer 104, that are used to send messages in association with one or more communications accounts. In an example, each communications account sends and receives messages over a communications channel associated with the communications account, such as over the Internet, via Short Messaging Service (SMS) channels, other channels, or combinations of these.

The portable electronic device 102 in some examples comprises an electronic communications device such as a smartphone, tablet, laptop, portable media player, or any other portable device able to communicate with remote systems. Although the illustrated example uses a portable electronic device 102 to illustrate certain aspects, it is clear that the aspects described herein are applicable to a large number of device types. Some examples of other types of devices to which the systems and method described herein can be applied include, but are not limited to, vehicles of various types, wearable electronics such as watches, glasses, and the like, photographic equipment such as cameras or the like, robotic devices or other autonomous, semi-autonomous, or otherwise functioning devices, devices used in conjunction with monitoring, aiding, or otherwise facilitating medical, health, personal wellness, or other personal monitoring devices, gaming devices of any type, Personal Digital Assistants, personal navigation devices, any other type of device, or combinations of these.

The portable electronic device 102 in an example is able to communicate with others over various communications media using various communications tools. In the illustrated example, the portable electronic device 102 is in wireless communications, via a first wireless data communications link 122, with a cellular data communications infrastructure 110, with a wireless local area network (WLAN) access point 112 via a second wireless data communications link 124, or with a combination of these. Although only one example radio transmission tower is illustrated for simplicity of understanding to represent the cellular data communications infrastructure 110, it is clear that any suitable long range data communications medium is able to be used that uses one or more transceivers at various geographical locations to communicate data with the portable electronic device.

The portable electronic device 102 is able to use various executable applications or other tools to allow communications with other devices. For example, the portable electronic device is able to use applications or other tools to communicate over various communications channels, such as e-mail, BlackBerry Messaging (BBM®), messaging, social media, other communications channels, or combinations of these. These communications media allow a user to activate a user's account, such as a user's e-mail account, a user's social media feed, a user's social networking account, a user's instant messaging account, other user's accounts, or combinations of these, on one or more devices, and each device with an activated account receives all updates for that account, even if the update is sent through an activated account on another device. Examples of social media accounts include, but are not limited to, various communications platforms such as those known under various names including, by way of example and in no way limiting, Facebook®, Twitter®, Instagram®, Snapchat®, Vine®, YouTube®, Pinterest®, Tumblr®, LinkedIn®, Foursquare®, Reddit®, other social networks or platforms, or combinations of these.

The illustrated portable electronic device 102 is shown to have a keyboard 130 to support user inputs, and a screen 132 to support visual outputs to the user. The screen 132 in some examples is able to support touch sensing to allow the screen to be used as an input device by the user's touching of the screen. In various examples, the keyboard 130 is able to be a physical keyboard with mechanical keys, or a virtual keyboard that is displayed on a portion of a screen 132 that supports touch based inputs to allow the user to enter data by touching portions of the screen displaying particular keys. In further examples, a portable electronic device 102 is able to include further user interface facilities which are not depicted here in order to more clearly present aspects of the below described systems and methods.

The computer 104 in some examples provides comparable functionality with regards to communicating with other devices over various communications channels. The computer 104 is able in one example to communicate over one or more of the same communications channels as the portable electronic device 102. In an example, the computer 104 is able to communicate with applications or other tools via one or more of e-mail, BlackBerry Messaging (BBM®), messaging, social media, other communications channels, or combinations of these. As discussed above, all devices that are activated for a particular communications account used by a user receives updates sent by that user from any device. In an example, when a user has an activated account on the computer 104 and on the portable electronic device 102 and that user sends on update from the computer 104, the portable electronic device 102 also receives that update.

In the illustrated multiple communications device environment 100, all devices are able to communicate with one another via various networking structures. For example, the cellular data communications infrastructure 110 is connected to a wide area communications network 120, such as the Internet or another data communications network, via the first wide area network data communications link 114. In the illustrated example, the computer 104 and WLAN access point 112 are also connected to the wide area communications network 120 via a second wide area network data communications link 116. This allows all devices to communicate with one another.

In addition to message communications, some user accounts allow a user to store data on multiple devices and a modification of data on one device is then synchronized with data on all other devices activated with that user account. For example a data file is able to be stored on all devices that are activated with a user's account, and any modification to a data portion comprising either a part of or the whole data file is synchronized, e.g., communicated to, the other devices so the data portion is correspondingly modified on all devices. In the illustrated example, a user account is able to store data for a user on both the portable electronic device 102 and the computer 104. Modification of that data on one of those devices causes an update indicating the modification of the data portion to be sent to the other device that causes the same modification to be made on that other device.

Figure 2:
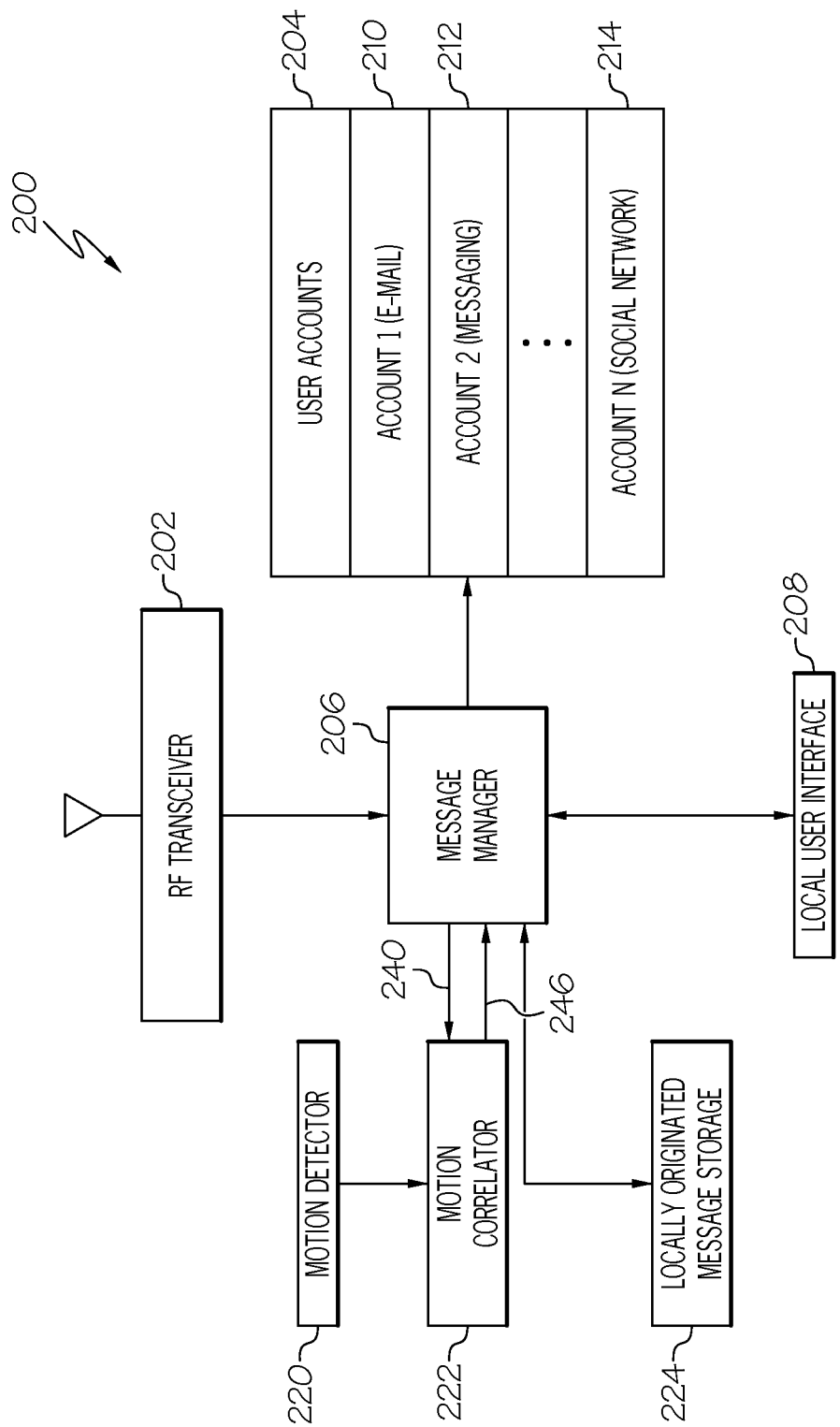
FIG. 2 illustrates a portable electronic device messaging components block diagram, according to an example.

FIG. 2 illustrates a portable electronic device messaging components block diagram 200, according to an example. The portable electronic device messaging components block diagram 200 depicts an example of components within the portable electronic device 102, as is described above, that are used to exchange messages or other updates between the portable electronic device 102 and other devices. The portable electronic device messaging components block diagram 200 depicts components and interconnections between those components of a device that is able to monitor the device and determine suspicious movement of the device. In general, the portable electronic device 102 has other components to support its operations. Those other components are not illustrated or discussed in this description in order to more clearly describe relevant aspects of the below described systems and methods.

The portable electronic device messaging components block diagram 200 includes an RF transceiver 202 that is used for communications with other devices over one or more wireless communications paths. In an example, the RF transceiver 202 is able to support communications with an a cellular data communications infrastructure 110 via a first wireless data communications link 122, and with a wireless local area network (WLAN) access point 112 via a second wireless data communications link 124 as are discussed above with regards to the multiple communications device environment 100. In further examples, the RF transceiver 202 is able to support wireless communications over other wireless links either individually or concurrently over any number of wireless links.

The RF transceiver 202 exchanges messages with a message manager 206. In one example, the message manager 206 coordinates sending and receiving of messages or other updates that are sent or received by a user in association with accounts that are activated on that device. The message manager 206 communicates with a user accounts storage 204. The user accounts storage 204 in one example stores all messages, updates, or other communications that are sent from or received by each account which the user has activated on the device. In one example, the user accounts storage 204 stores information associated with each user account activated on the device, such as user authentication information, message routing information, contact information for other users, other information, or combinations of these. The user accounts storage 204 stores information for any number of accounts. For example, the user accounts storage 204 is shown to store Account 1 information 210, where Account 1 is identified as an e-mail account. The illustrated user accounts storage 204 is further shown to store Account 2 information 212, where Account 2 is identified as a messaging account. Account N information 214 is also stored in the illustrated user accounts storage 204, where Account N is identified as a social networking account. Ellipses between the Account 2 information 212 and the Account N information 214 depict any number of other user accounts for which information is stored in the user account storage 204.

The portable electronic device messaging components block diagram 200 depicts a local user interface 208. In an example, the local user interface 208 consists of the user input and output facilities of the device. As illustrated above, the portable electronic device 102 has a local user interface that consists of the keyboard 130 as the user's input device, and the display 132 as the user's output device. In further examples, a device is able to have any number of user input or user output devices to facilitate the use of the device. In one example, the local user interface 208 is used by a user of the device to enter, originate and send a message or other update in association with an account that is activated on the device.

The message manager 206 in one example maintains a locally originated message storage 224. The locally originated message storage 224 is used to store information identifying messages that the user sent from this particular device. In some examples, the locally originated message storage 224 is able to store information that merely identifies the message, such as a message serial number, time/date stamp, other identifying information, or combinations of these. In further examples, the locally originated message storage 224 is able to store more information to identify particular messages sent by the device, such as message header information, portions or all of the message body, a copy of the entire message, or any combination or subsets of these. In one example, message identification data stored in the locally originated message storage 224 is compared to received messages that are indicated as being sent by the owner of the device to determine if the received message originated at the device, or if the received message did not originate at this device and was therefore sent from another device, which is referred to as a "remote device." An indication 240 that such a message was received is provided to a motion correlator 222, as is discussed below.

The portable electronic device messaging components block diagram 200 depicts a motion detector 220. Portable electronic devices incorporate various types of motion detectors, such as gyroscopes, accelerometers, radio navigation device, any other type of motions sensing device, or combinations of these.

A motion correlator 222 receives an indication 240 from the message manager 206 that a message or other update was sent by a user associated with an account activated on this device, but that message or update did not originate at this device but rather originated from a remote device. The motion correlator 222 also receives an indication 244 from the motion detector 220 that the device is in motion. In one example, when the motion correlator 222 receives both of these indications in a manner that indicates that the message or update was sent while this device is in motion, the motion correlator 222 sends an indication of suspicious movement 246 to the message manager 206. In various examples, the message manager 206 includes a notification generator that is able to provide a notification to the user of the unauthorized movement based on the determination of the suspicious movement. In various examples, the message manager 206 is also able to respond to this determination by various other techniques.

Figure 3:
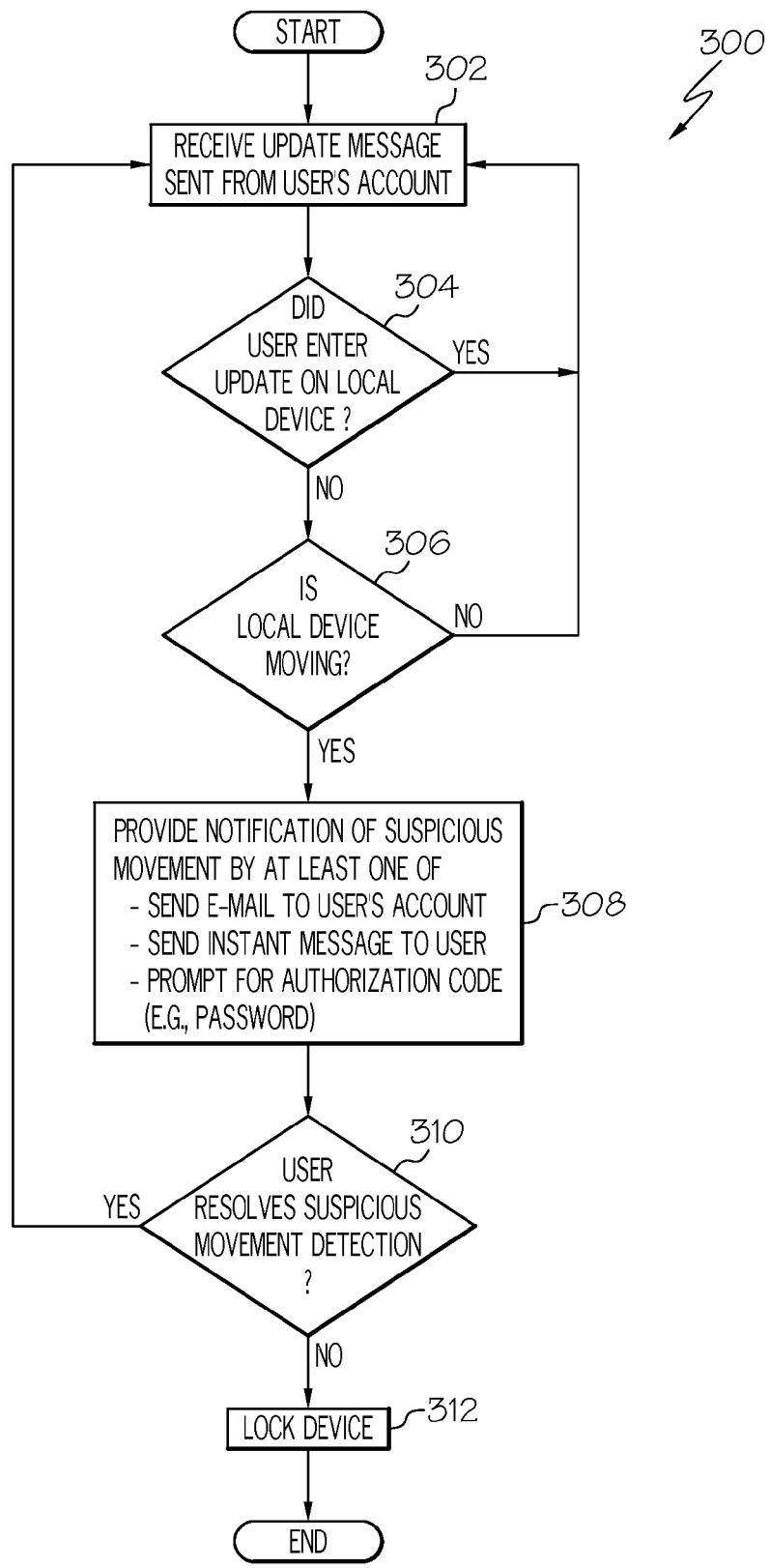
FIG. 3 illustrates a suspicious movement determination process, according to an example.

FIG. 3 illustrates a suspicious movement determination process 300, according to an example. The suspicious movement determination process 300 is an example of a method to monitor a device that is performed by the components illustrate above with regards to the portable electronic device messaging components block diagram 200. In the following discussion, a device performing the suspicious movement determination process 300 is referred to as the local device.

The suspicious movement determination process 300 begins by receiving, at 302, an update that was sent from the user's account. In the present discussion, the term "update" is used broadly to describe any data that is sent or received in conjunction with a user's account. An "update" is able to be any type of data communications message, such as an e-mail, text message, instant message, social networking posting, an update indicating synchronization of a modification of data made on a remote device, any other data, or combinations of these. As discussed above, an update is able to be any data sent by a user that is associated with an account registered on the local device performing this process whether that data is sent from the local device or another, remote, device.

The suspicious movement determination process 300 continues by determining, at 304, if the user entered the update on the local device. As discussed above, this determination is based on correlating messages sent from the local device with received messages that were went by the user who is associated with the account. If it is determined that the user did enter the update on the local device, the process returns to receiving an update sent from the user's account.

If it is determined that the user did not enter the update on the local device, the suspicious movement determination process 300 proceeds to determine, at 306, if the local device is moving. As discussed above, a determination that the local device is moving is able to be based on determinations made by the motion detector 220 as reported to the motion correlator 222. This determination is made in one example at a time associated with the received update. In one example, the time associated with the received update is able to be a time at which the received update was sent, as is reported to the motion correlator 222 by the message manager 206. In various examples, the motion of the local device is determined other times associated with the update, such as at one or more of a time that corresponds to an indication of when the received message was sent, such as is provided in a message header or other information, a time at which the received message was received by the local device, a synthesis or composite of motion determinations observed over a timespan that includes one or both of the time the received message was sent and the time the received message was received, any other relevant single or several motion determinations, or combinations of these. If it is determined that the local device is not moving at the time associated with the update, the suspicious movement determination process 300 returns to receiving an update that was sent from the user's account, at 302.

If it is determined that the local device is moving at the relevant times associated with the received update, the suspicious movement determination process 300 provides a notification, at 308, of suspicious movement. This notification is able to be provided by any suitable technique. In some examples, a data message such as an e-mail is able to be sent to the user's account, a data message such an instant message is able to be sent to the user, the local device is able to prompt the user to enter an authorization code such as a password, further types of notifications are able to be provided by any other suitable technique, or by any combination of these.

The notification of the suspicious movement in further examples are able to include, either alone or in conjunction with other notifications, an audible aspect such as, but not limited to, a tone, alarm, speech message, other audible notification, or combinations of these. The notification are also able to include, either alone or in conjunction with other notifications, a visual aspect such as, but not limited to, one or more flashing lights, e.g., LED(s), a colored light, other types of lighting, a popup message, a banner that is presented on a device, any visual notification, or combinations of these. The notification is also able to include, either alone or in conjunction with other notifications, a haptic aspect such as vibration, other movement of part or all of a device normally in contact with a user, other haptic indications, or combinations of these.

The notification in some examples is further able to include, either alone or in conjunction with other notifications, information such as, but not limited to, a date, time, place of suspicious movement, other information, or combinations of these. Such additional information is able to be included in, for example a data message that is sent to devices other than the device whose suspicious movement has been detected. The notification is also able to include, either alone or in conjunction with other notifications, a representation or other indication of a map of movement of the device. Subsequent notifications of further suspicious movement are also further able to be provided with updated information such as, by way of example and without limitation, updated date, time, starts and stops of movement of the device, place(s) of movement of the device, a map showing a trail or route of movement, other information, or combinations of these.

Based on prompting for entry of the authorization code, the local device in some examples suspends at least one function of the local device until the authorization code is entered. Suspending at least one function is able to include, for example, locking the user interface of the device to prevent usage other than entry of the authorization code, preventing access to any data stored on the device, limiting a usage of one or more portions of the device, any limitation of device usability, or combinations of these.

After providing the notification, at 308, a determination is made as to whether the user resolves the suspicious movement detection. In an example, resolving the suspicious movement is based on the user acknowledging or otherwise indicating that the movement is authorized. In various examples, if the device's movement is authorized, a user is able to ignore e-mails or instant messages providing the notification for a determined amount of time. In an example, if a user does not take further action after that determined amount of time after the notification(s) are sent, the suspicious movement is assumed to be authorized and the lack of action serves as a resolution of the suspicious movement. The user is also able to enter the authentication data, such as a password, to resolve the suspicious movement. If the user resolves the suspicious movement, the suspicious movement determination process 300 returns to receiving an update that was sent from the user's account, at 302.

In one example, if the user does not resolve the suspicious movement, the failure to resolve the suspicious movement indicates that the movement is unauthorized and that further protective measures may be desired. In one example, the device is locked, at 312, based on a determination that the user did not resolve the suspicious movement detection. In some examples, locking the device may be based on the user's initiating or otherwise affirming the action to lock the device. In further examples, other actions are able to be taken based on the user's not resolving the suspicious movement. The suspicious movement determination process 300 then ends.

Figure 4:
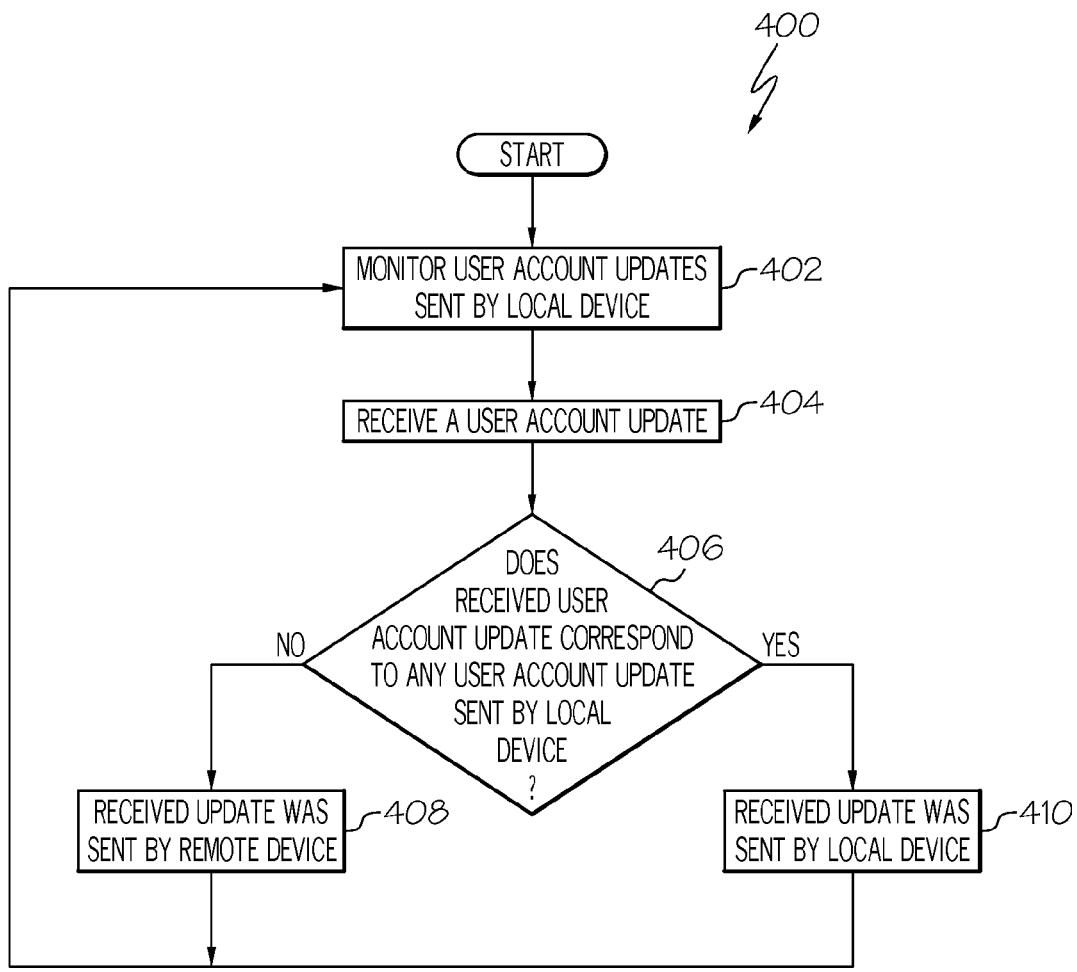
FIG. 4 illustrates an update origination determination process, according to an example.

FIG. 4 illustrates an update origination determination process 400, according to an example. The update origination determination process 400 is an example of a process contained within the determining if the user entered the update on the local device 304 as is described above with regards to the suspicious movement determination process 300 to determine if a received update from the user of an account originated at the local device.

The update origination determination process 400 begins by monitoring, at 402, user account updates sent by the local device. This monitoring is able to be based on monitoring usage of the local user interface 208 of the local device, monitoring update transmissions, other techniques, or combinations of these. Indications of messages sent by the local device are able to be stored in the locally originated message storage 224, as is described above with regards to the portable electronic device messaging components block diagram 200.

The update origination determination process 400 continues by receiving, at 404, a user account update. In some communications channels, updates for an account are sent to all devices that have that account activated, whether those updates were sent by that device or by another device.

The update origination determination process 400 determines, at 406, if the received user account update corresponds to any user account update sent by the local device. In an example, such a determination is made by the message manager based on a comparison of received updates to data stored in the locally originated message storage 224, as is described above with regards to the portable electronic device messaging components block diagram 200.

If a correspondence is determined, at 406, between the received update and a message sent by the local device, it is declared, at 408, that the received update was sent by the remote device. If this correspondence is not determined, it is declared, at 410, that the received message update was not sent by the local device. The update origination determination process 400 then returns to monitoring, at 402, user account updates sent by the local device.

Figure 5:
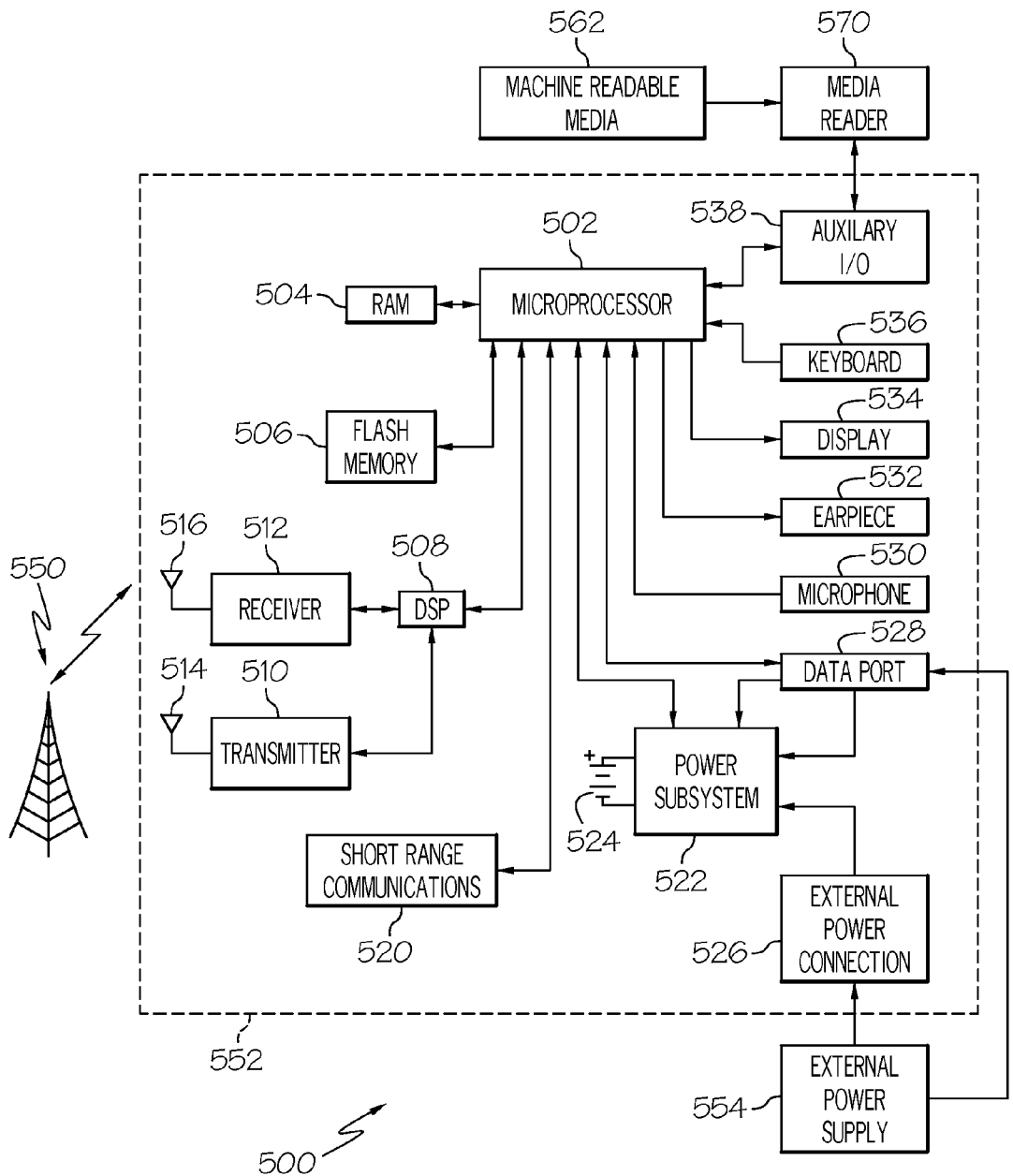
FIG. 5 is a block diagram of an electronic device and associated components in which the systems and methods disclosed herein may be implemented.

FIG. 5 is a block diagram of an electronic device and associated components 500 in which the systems and methods disclosed herein may be implemented. In various examples, the electronic device 552 is able to be an example of the above described portable electronic device 102, which is an example of a wireless two-way communication device with voice, text chat, and data communication capabilities. Such electronic devices communicate with a wireless voice, text chat, or data network 550 using a suitable wireless communications protocol. Wireless voice communications are performed using either an analog or digital wireless communication channel. Data communications allow the electronic device 552 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 552 is an example electronic device that includes two-way wireless communications functions. Such electronic devices incorporate communication subsystem elements such as a wireless transmitter 510, a wireless receiver 512, and associated components such as one or more antenna elements 514 and 516. A digital signal processor (DSP) 508 performs processing to extract data from received wireless signals and to generate signals to be transmitted. The particular design of the communication subsystem is dependent upon the communication network and associated wireless communications protocols with which the device is intended to operate.

The electronic device 552 includes a microprocessor 502 that controls the overall operation of the electronic device 552. The microprocessor 502 interacts with the above described communications subsystem elements and also interacts with other device subsystems. In various examples, the electronic device 552 is able to include one or more of various components such as flash memory 506, random access memory (RAM) 504, auxiliary input/output (I/O)

device 538, data port 528, display 534, keyboard 536, earpiece 532, audio sound reproduction system 570, microphone 530, a short-range communications subsystem 520, a power subsystem 522, other subsystems, or combinations of these.

One or more power storage or supply elements, such as a battery 524, are connected to a power subsystem 522 to provide power to the circuits of the electronic device 552. The power subsystem 522 includes power distribution circuitry for providing power to the electronic device 552 and also contains battery charging circuitry to manage recharging the battery 524 (or circuitry to replenish power to another power storage element). The power subsystem 522 receives electrical power from external power supply 554. The power subsystem 522 is able to be connected to the external power supply 554 through a dedicated external power connector (not shown) or through power connections within the data port 528. The power subsystem 522 includes a battery monitoring circuit that is operable to provide a status of one or more battery status indicators, such as remaining capacity, temperature, voltage, electrical current consumption, and the like, to various components of the electronic device 552.

The data port 528 is able to support data communications between the electronic device 552 and other devices through various modes of data communications, such as high speed data transfers over an optical communications circuits. Data port 528 is able to support communications with, for example, an external computer or other device. In some examples, the data port 528 is able to include electrical power connections to provide externally provided electrical power to the electronic device 552, deliver electrical power from the electronic device 552 to other externally connected devices, or both. Data port 528 of, for example, an electronic accessory is able to provide power to an electronic circuit, such as microprocessor 502, and support exchanging data between the microprocessor 502 and a remote electronic device that is connected through the data port 528.

Data communication through data port 528 enables a user to set preferences through the external device or through a software application and extends the capabilities of the device by enabling information or software exchange through direct connections between the electronic device 552 and external data sources rather than via a wireless data communication network. In addition to data communication, the data port 528 provides power to the power subsystem 522 to charge the battery 524 or to supply power to the electronic circuits, such as microprocessor 502, of the electronic device 552.

Operating system software used by the microprocessor 502 is stored in flash memory 506. Further examples are able to use a battery backed-up RAM or other non-volatile storage data elements to store operating systems, other executable programs, or both. The operating system software, device application software, or parts thereof, are able to be temporarily loaded into volatile data storage such as RAM 504. Data received via wireless communication signals or through wired communications are also able to be stored to RAM 504. The microprocessor 502 in some examples includes a component, such as is able to be defined in flash memory 506 in one example, that are one or more of a message manager, a motion correlator, and a notification generator.

The microprocessor 502, in addition to its operating system functions, is able to execute software applications on the electronic device 552. A set of applications that control basic device operations, including at least data and voice communication applications, is able to be installed on the electronic device 552 during manufacture. In an example, programs and other data used to support the processes described above are able to be installed in the memory of the electronic device 552. Further examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 552 through, for example, the wireless network 550, an auxiliary I/O device 538, Data port 528, short-range communications subsystem 520, or any combination of these interfaces. Such applications are then able to be installed by a user in the RAM 504 or a non-volatile store for execution by the microprocessor 502.

In a data communication mode, a received signal such as a text message or web page download is processed by the communication subsystem, including wireless receiver 512 and wireless transmitter 510, and communicated data is provided the microprocessor 502, which is able to further process the received data. In some examples, the electronic device 552 includes a display, output ports, or combinations of these. In such example, the received data is able to be processed for output to the display 534, or alternatively, to an auxiliary I/O device 538 or the Data port 528. In examples of the electronic device 552 that include a keyboard 536 or other similar input facilities, a user of the electronic device 552 may also compose data items, such as e-mail messages, using the keyboard 536, which is able to include a complete alphanumeric keyboard or a telephone-type keypad, in conjunction with the display 534 and possibly an auxiliary I/O device 538. Such composed items are then able to be transmitted over a communication network through the communication subsystem.

For voice communications, overall operation of the electronic device 552 is substantially similar, except that received signals are generally provided to an earpiece 532 and signals for transmission are generally produced by a microphone 530. Alternative voice or audio I/O subsystems, such as a voice message recording subsystem, may also be implemented on the electronic device 552. Although voice or audio signal output is generally accomplished primarily through the earpiece 532, in examples of electronic devices 552 that include a display 534, the display 534 may also be used to provide an indication of the identity of a calling party, the duration of a voice call, or other voice call related information, for example.

Depending on conditions or statuses of the electronic device 552, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short-range communications subsystem 520 provides for data communication between the electronic device 552 and different systems or devices, which need not necessarily be similar devices. For example, the short-range communications subsystem 520 includes an infrared device and associated circuits and components or a Radio Frequency based communication module such as one supporting Bluetooth® communications, to provide for communication with similarly-enabled systems and devices, including the data file transfer communications described above. In some examples, the short-range communications subsystem 520 is able to include a Wi-Fi® communications component that is able to provide relatively short range data communications to support, for example, communications over the Internet, other data networks, or combinations of these. In some examples, the short-range communications subsystem 520 is able to include a Near Field Communications (NFC) receiver, transmitter, or transceiver to communication with other suitably equipped devices via any NFC protocol.

The electronic device 552 in some examples is able to include a geolocation device (not shown) that communicates with the microprocessor 502 and is able to provide a geographical location for the electronic device 552. Geolocation devices that are able to be included in an electronic device 552 include, by way of example in no way limitation, a Global Positioning System (GPS) receiver, an Assisted-GPS (A-GPS) receiver, a GLONASS receiver, receivers or other processors based on various geolocation techniques, or combinations of these.

A media reader 560 is able to be connected to an auxiliary I/O device 538 to allow, for example, loading computer readable program code of a computer program product into the electronic device 552 for storage into flash memory 506. One example of a media reader 560 is an optical drive such as a CD/DVD drive, which may be used to store data to and read data from a computer readable medium or storage product such as computer readable storage media 562. Examples of suitable computer readable storage media include optical storage media such as a CD or DVD, magnetic media, or any other suitable data storage device. Media reader 560 is alternatively able to be connected to the electronic device through the Data port 528 or computer readable program code is alternatively able to be provided to the electronic device 552 through the wireless network 550.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method comprising:
   determining that a local device received an update, wherein the update originated from a remote device that is different from the local device, and wherein the update comprises data being sent in association with a user account activated on the local device;
   determining, at the local device, that the local device is moving at a time associated with the update;
   determining a suspicious movement of the local device based upon the determining that the local device is moving at a time associated with the update and based upon determining the update originated from the remote device; and
   based upon determining the suspicious movement, providing a notification of unauthorized device movement.

2. The method of claim 1, wherein providing the notification comprises:
   prompting for entry of an authorization code on the local device; and
   suspending until entry of the authorization code, based on the prompting, at least one function on the local device.

3. The method of claim 1, wherein providing the notification comprises sending a data message indicating the suspicious movement.

4. The method of claim 3, wherein the data message further comprises a geographical location of the local device.

5. The method of claim 1, wherein the user account comprises a user's messaging account, wherein the update comprises a message sent from the user's messaging account, and wherein determining the update originated from the remote device comprises determining that the message was not entered on the local device.

6. The method of claim 1, wherein the user account comprises data stored on the local device and the remote device, wherein a modification of a data portion associated with the user account on the remote device is synchronized with the data portion on the local device, wherein the update comprises an update indicating the modification of the data portion, and wherein determining the update originated from the remote device comprises determining that the modification was not entered on the local device.

7. The method of claim 1, wherein the user account comprises a user's social networking account, wherein the update comprises an update to the user's social networking account, and wherein determining the update originated from the remote device comprises determining that the update to the user's social networking account was not entered on the local device.

8. The method of claim 1, wherein the time associated with the update comprises at least one of a time the update was sent, or a time the update was received at the local device.

9. A device, comprising:
   at least one processor configured to implement:
   a message manager that when operating determines that the device received an update, wherein the update originated from a remote device that is different from the device, and wherein the update comprises data being sent in association with a user account activated on the device;
   a motion detector that when operating determines that the device is moving at a time associated with the update;
   a motion correlator that when operating determines a suspicious movement of the device based upon a determination that the device is moving at a time associated with the update and based upon a determination the update originated from the remote device; and
   a notification generator that when operating provides a notification of unauthorized device movement based upon determining the suspicious movement.

10. The device of claim 9, wherein the notification generator when operating further:
    prompts for entry of an authorization code on the device; and
    suspends until entry of the authorization code, based on a prompt for entry of an authorization code, at least one function on the device.

11. The device of claim 9, wherein the notification generator when operating further sends a data message indicating the suspicious movement.

12. The device of claim 11, wherein the data message further comprises a geographical location of the device.

13. The device of claim 9, wherein the user account comprises a user's messaging account, wherein the update comprises a message sent from the user's messaging account, and wherein the message manager determines the update originated from the remote device by at least determining that the message was not entered on the device.

14. The device of claim 9, wherein the user account comprises data stored on the device and the remote device, wherein a modification of a data portion associated with the user account on the remote device is synchronized with the data portion on the device, wherein the update comprises an update indicating the modification of the data portion, and wherein message manager determines the update originated from the remote device by at least determining that the modification was not entered on the device.

15. The device of claim 9, wherein the account comprises a user's social networking account, wherein the update comprises an update to the user's social networking account, and wherein message manager determines the update originated from the remote device by at least determining that the update to the user's social networking account was not entered on the device.

16. The device of claim 9, wherein the time associated with the update comprises at least one of a time the update was sent, or a time the update was received at the device.

17. A non-transitory computer readable storage medium having computer readable program code embodied therewith, the computer readable program code comprising instructions executable by a processor to:
    determine that a local device received an update, wherein the update originated from a remote device that is different from the local device, and wherein the update comprises data being sent in association with a user account activated on the local device;
    determine, at the local device, that the local device is moving at a time associated with the update;
    determine a suspicious movement of the local device based upon determining that the local device is moving at a time associated with the update and based upon determining the update originated from the remote device; and
    based upon determining the suspicious movement, provide a notification of unauthorized device movement.

18. The non-transitory computer readable storage medium of claim 17, wherein the instructions to provide the notification comprise instructions to:
    prompt for entry of an authorization code on the local device; and
    suspend until entry of the authorization code, based on the prompting, at least one function on the local device.

19. The non-transitory computer readable storage medium of claim 17, wherein the instructions to provide the notification comprise instructions to send a data message indicating the suspicious movement.

20. The non-transitory computer readable storage medium of claim 19, wherein the data message further comprises a geographical location of the local device.

* * * * *